United States Patent

Tutumishita

[11] Patent Number: 5,994,861
[45] Date of Patent: Nov. 30, 1999

[54] SERVO SYSTEM

[75] Inventor: Youji Tutumishita, Tokyo, Japan

[73] Assignee: Mitsubishi Denki Kabushiki Kaisha, Tokyo, Japan

[21] Appl. No.: 08/895,985

[22] Filed: Jul. 17, 1997

[30] Foreign Application Priority Data

Mar. 25, 1997 [JP] Japan .................................. 9-072388

[51] Int. Cl.⁶ .................................................. G05B 11/32
[52] U.S. Cl. ...................... 318/562; 318/568.2; 318/625; 318/51
[58] Field of Search ............................... 318/562, 568.2, 318/625, 34, 51, 66–70, 85

[56] References Cited

U.S. PATENT DOCUMENTS

| 4,047,003 | 9/1977 | LaRocca et al. . | |
| 4,200,925 | 4/1980 | Cushman ............................ | 318/562 X |
| 4,323,098 | 4/1982 | Suzuki et al. ............................ | 144/420 |
| 4,422,027 | 12/1983 | Mohlere .................................. | 318/687 |
| 4,544,866 | 10/1985 | Clemmons et al. ....................... | 318/54 |
| 4,631,689 | 12/1986 | Arimura et al. .......................... | 395/80 |
| 4,931,712 | 6/1990 | DiGiulio et al. ......................... | 318/625 |
| 5,136,222 | 8/1992 | Yamamoto et al. . | |
| 5,237,250 | 8/1993 | Zeile et al. ............................... | 318/562 |
| 5,241,250 | 8/1993 | Nagasawa et al. ....................... | 318/591 |
| 5,268,898 | 12/1993 | Kazato .................................... | 370/447 |
| 5,361,260 | 11/1994 | Mito ........................................ | 370/452 |

FOREIGN PATENT DOCUMENTS

| 0 434 986 | 7/1991 | European Pat. Off. . |
| 0 577 567 | 1/1994 | European Pat. Off. . |

*Primary Examiner*—Brian Sircus
*Attorney, Agent, or Firm*—Sughrue, Mion, Zinn, Macpeak & Seas, PLLC

[57] ABSTRACT

In a servo system having a controller such as a numeric controller for multi-axes control and a plural number of drive-unit-built-in servo motors, a branching circuit (2) is provided between the controller and the drive-unit-built-in servo motors to communicate through branching of the signals from the branching circuit (2) to the drive-unit-built-in servo motors (3). A constant voltage is output from the drive units and charged on the resistors (14) in the branching circuit (2) with resistance values different from one another in each shaft and the shaft numbers are identified through the detection of the currents flowing out at that time by the drive units in the drive-unit-built-in servo motors (3). The servo system realizes the reduction in wiring, the enhanced reliability and the elimination of hardware settings.

8 Claims, 6 Drawing Sheets

SERVO SYSTEM

BACKGROUND OF THE INVENTION

The present invention relates to a servo system which carries out a feedback control of positions, speeds and so on of machine tools and so on.

In recent years, a serial multi-drop method is generally used to connect a controller, such as a numeric control apparatus or a motion controller, for controlling a plural number of shafts to servo drive units. FIG. 5 is a wiring diagram of an exemplified system utilizing a drive-unit-built-in servo motors in which a servo drive unit is incorporated. The figure shows that a controller 1 and a drive-unit-built-in servo motor 5a are connected by a cable 4a and a second drive-unit-built-in servo motor 5b and the drive-unit-built-in servo motor 5a are connected by a cable 4b. A third one and a succeeding one are connected in series in the same way, and the drive-unit-built-in servo motors 5a, 5b, 5c and 5d respectively comprise rotary switches 19a, 19b, 19c and 19d for shaft number identification.

FIG. 6 shows a detailed signal diagram of the exemplified system. The figure shows that the send data from the controller 1 are transmitted as serial data for all shafts through the identical lines. From the serial data received, the servo drive units in the drive-unit-built-in servo motors respectively select data which correspond to their respective shaft numbers and drive servo motors based on the data. (FIG. 6 does not show detailed circuits, servo motors and other components beyond line drivers and line receivers of the servo drive units inside the drive-unit-built-in servo motors. The drive-unit-built-in servo motor 5d is omitted in the figure.) At this moment, the shaft numbers are identified on the basis of the settings of hardware such as rotary switches 19 provided inside the servo drive units.

The signals from the drive-unit-built-in servo motors are output to the identical line by time division and transmitted to the controller 1. An emergency stop (EMG) signal is output from the controller 1 and transmitted to the first drive-unit-built-in servo motor 5a. The drive-unit-built-in servo motor 5a transmits logical sum of the received EMG signal and an alarm signal of its own to the second drive-unit-built-in servo motor 5b. The processing proceeds in the same way till the final shaft and the output from the drive-unit-built-in servo motor of the last shaft is transmitted to the controller 1.

Since distances between the drive-unit-built-in servo motors in the exemplified system shown in FIGS. 5 and 6 are long, a total cable length is so extensive that there has been a fear that communication on the side of the last shaft may be disabled by such as an influence of reflected waves. In the exemplified system, since each of the drive-unit-built-in servo motors is connected to two cables, a large space needed for the connector on the side of the servo motors and a complicated cable arrangement have been the problems.

Another problem has been that, since the shaft numbers are set by setting such hardware as the rotary switches 19 attached to the drive-unit-built-in servo motors, alteration in the setting is not always easy, depending on the location of the servo motors. Still another problem has been that the structure becomes complicated since such hardware as the rotary switches 19 needs to have an anti-splash structure.

SUMMARY OF THE INVENTION

The present invention relates to a servo system comprising a controller, a plurality of drive-unit-built-in servo motors which are controlled by the controller, and a branching circuit that branches and transmits signals from the controller respectively to the drive-unit-built-in servo motors and that transmits logical sum of signals from the drive-unit-built-in servo motors to the controller.

The branching circuit has as many line drivers as a product of the number of signal lines for receiving signals from the controller, multiplied by the number of the drive-unit-built-in servo motors, and the line drivers in the branching circuit and line receivers in the drive-unit-built-in servo motors are connected by one to one.

The branching circuit has as many line receivers as a product of the number of signal lines for transmitting signals to the controller, multiplied by the number of the drive-unit-built-in servo motors, and the line receivers in the branching circuit and the line drivers in the drive-unit-built-in servo motors are connected by one to one.

The branching circuit transmits the logical sum of received data transmitted from the drive-unit-built-in servo motors to the controller.

The branching circuit transmits logical sum of alarm signals transmitted from the drive-unit-built-in servo motors to the controller.

The branching circuit has as many resistors as the number of drive-unit-built-in servo motors, wherein the resistance values thereof are different from one another, and the drive-unit-built-in servo motors respectively have a constant voltage circuit and an identification means for detecting a current which flows out of the constant voltage circuit and flows into the resistor and for identifying shaft numbers based on this detection result.

Each of the drive-unit-built-in servo motors has a memory means and an identification means for identifying a shaft number based on the data which are inherent to the motor and stored in this memory means.

DETAILED DESCRIPTION OF THE PREFERRED EMBODIMENTS

Figure 1:
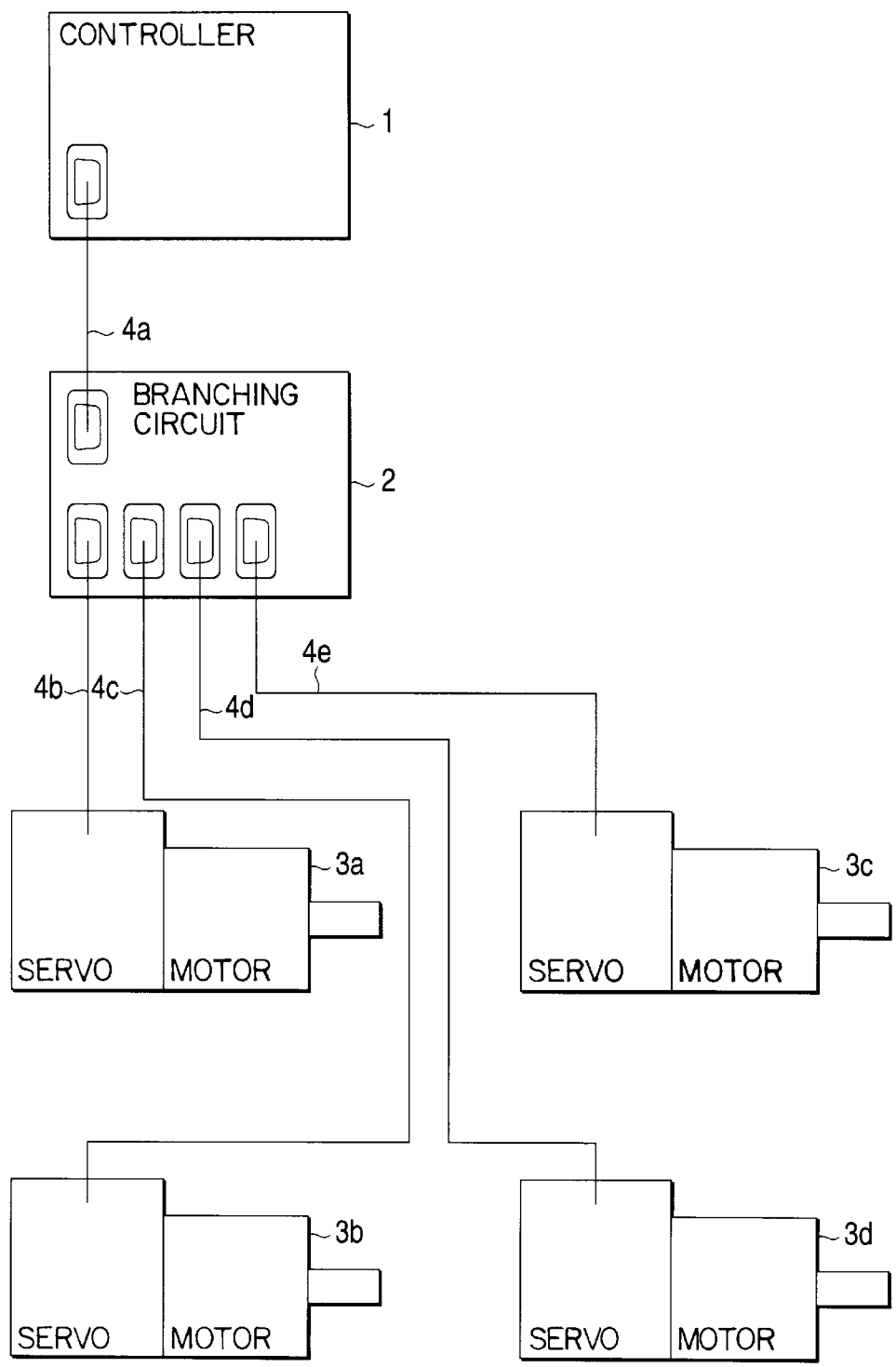
FIG. 1 is a wiring diagram of a servo system in an embodiment of the present invention.

An embodiment of the present invention is described below. FIG. 1 is a wiring diagram of a servo system wherein drive-unit-built-in servo motors as an embodiment of the present invention are utilized. As in the figure, a command cable 4a from a controller 1 inputs to a branching circuit 2, and the branching circuit 2 is connected respectively to drive-unit-built-in servo motors 3a, 3b, 3c and 3d by cables 4b, 4c, 4d and 4e.

Figure 2:
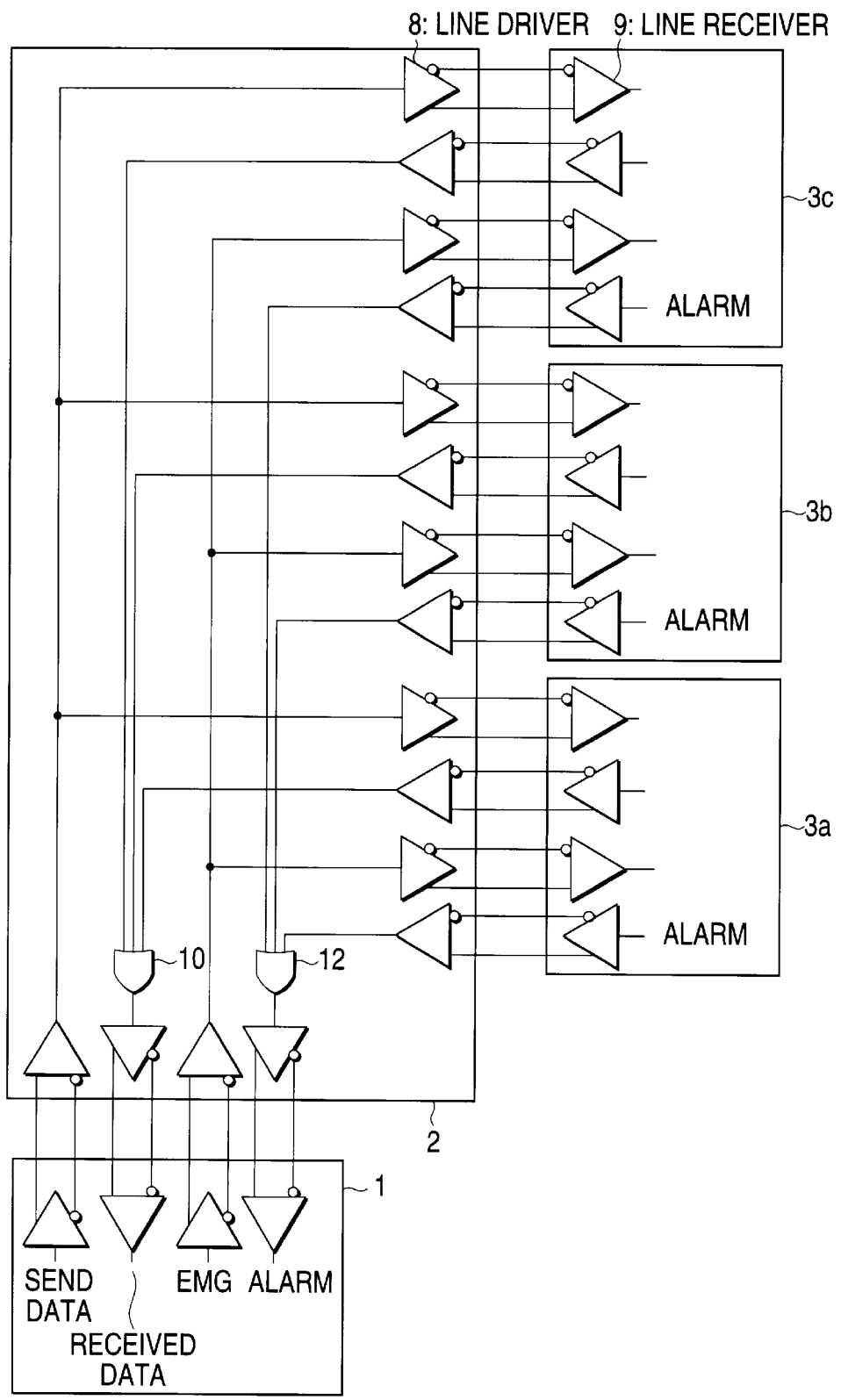
FIG. 2 is a detailed signal diagram of the servo system in an embodiment of the present invention.

FIG. 2 shows detailed signal routes in FIG. 1. As the figure shows, the send data (command data) from the controller 1 are transmitted to the branching circuit 2 as serial data. The data are temporarily received by a line receiver in the branching circuit 2 and then transmitted to respective shafts via line drivers. As many line drivers as the number of the shafts are mounted and connected to the line receivers of the servo drive units inside the drive-unit-built-in servo motors by one to one. The servo drive units inside the drive-unit-built-in servo motors select the commands corresponding to the shaft numbers of their own from the received command data. The shaft number selection method is described later. FIG. 2 does not show detailed circuits, servo motors and other components beyond the line drivers and line receivers of the servo drive units inside the drive-unit-built-in servo motors. The drive-unit-built-in servo motor 3d is omitted in the figure.

The received data which are transmitted from the servo drive units inside the drive-unit-built-in servo motors and received by the branching circuit 2 are output from the servo drive units by time division corresponding to the timings designated for the shafts respectively. The received data are received by the line receiver in the branching circuit 2. As many line receivers as the number of the shafts are mounted and connected to the line drivers of the servo drive units inside the drive-unit-built-in servo motors by one to one. Such a structure as above, wherein the signal transmission distance of the line drivers is between the branching circuit 2 and the drive-unit-built-in servo motors, is different from the exemplified system wherein reliability in the communication is degraded by increase in the total cable length caused by increase in the number of shafts, and the communication will not be degraded by increase in the number of shafts. The logical sum is obtained through an OR circuit 10 in the branching circuit 2 for received data respectively from the shafts and the results are transmitted to the controller 1 via the line driver. Since such a mere wired OR circuit as in the exemplified system is not utilized, degradation in reliability in communication by the waves reflected from other shafts is effectively prevented.

The following describes the processing of the emergency stop signals and the alarm signals. As FIG. 2 shows, the emergency stop signals are output from the controller 1 and transmitted to the branching circuit 2. In the branching circuit 2, the emergency stop signals are received temporarily by the line receiver and then transmitted respectively to the shafts via the line drivers. As many line drivers as the number of the shafts are mounted on the branching circuit 2 and connected to the line receivers of the servo drive units inside the drive-unit-built-in servo motors by one to one.

The alarm signals are output from the servo drive units inside the drive-unit-built-in servo motors to the branching circuit 2 via the line drivers. The alarm signals are received by the line receivers in the branching circuit 2. As many line receivers as the numbers of the shafts are mounted on the branching circuit 2 and connected to the line drivers of the servo drive units inside the drive-unit-built-in servo motors by one to one. The logical sum is obtained through an OR circuit 12 in the branching circuit 2 for the signals respectively from the shafts and the results are transmitted to the controller 1 via the line driver.

Such an embodiment of the present invention as described above is effective in construction of a servo system which saves wiring. Reduction in the total length of cables connected to each of the drivers and the receiver circuits sufficiently ensures the driving ability and, with removal of signal reflections, reliability in communication is increased.

Figure 3:
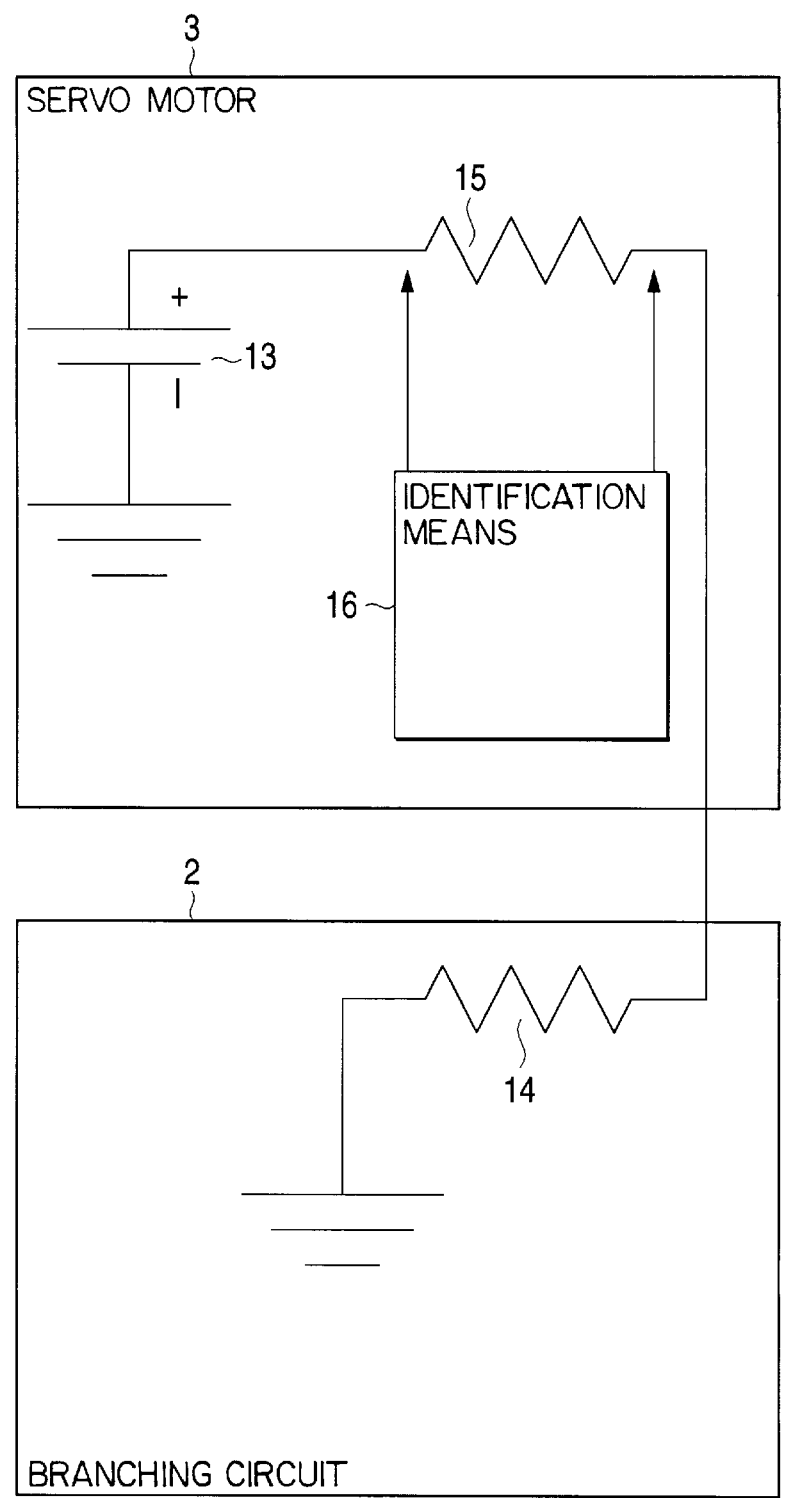
FIG. 3 is a block diagram of showing the shaft number identification part in an embodiment of the present invention.

Referring to FIG. 3, the following describes the shaft number selection method. As the figure shows, a constant voltage is output from a constant voltage output circuit 13 provided on the servo drive unit inside the drive-unit-built-in servo motors, and the constant voltage output is charged on such a resistor provided in the branching circuit 2 as a shaft identification resistor 14 via an output resistor 15 provided on the servo drive unit inside the drive-unit-built-in servo motor (as many shaft identification resistors 14 as the number of the drive-unit-built-in servo motors, or the number of the shafts, are provided within the branching circuit 2 and the respective resistance values thereof are different from one another). When the current flowing out at this time is specified by measuring both end voltages of the output resistor 15 with a voltage detector (not shown in the figure) inside the servo drive unit, a CPU (not shown in the figure) refers to a cross-reference table of the amperages versus the shaft numbers which are stored beforehand in a memory (not shown in the figure) which is provided on the same servo drive unit, and the CPU identifies the shaft number. An identification means 16 for identifying the shaft number in this embodiment of the present invention consists of the voltage detector, the memory and the CPU described above.

The amperage may be measured by a current sensor for measuring the current instead of utilization of the output resistor 15.

Alternatively, the CPU may identify the shaft number based on a measurement of the divided voltage at the output resistor 15 and the shaft determination resistor 14 (potential at a connection point of the output resistor 15 and the shaft identification resistor 14) and on a cross-reference table of the divided voltages versus the shaft numbers which are stored beforehand in a memory.

In this embodiment of the present invention, the set-up is easy with no need of settings of the hardware on the side of the motor for shaft identification. Since the shaft identification is not based on the hardware settings inside the servo drive units of the drive-unit-built-in servo motors, the set-up is easy and the drive-unit-built-in servo motors may have a simple structure. Moreover, although the exemplified system wherein the rotary switches are utilized for shaft identification required to operate the rotary switches mechanically by men or robots for the operational check thereof at shipping test, this method does not require such a test switch as above.

Figure 4:
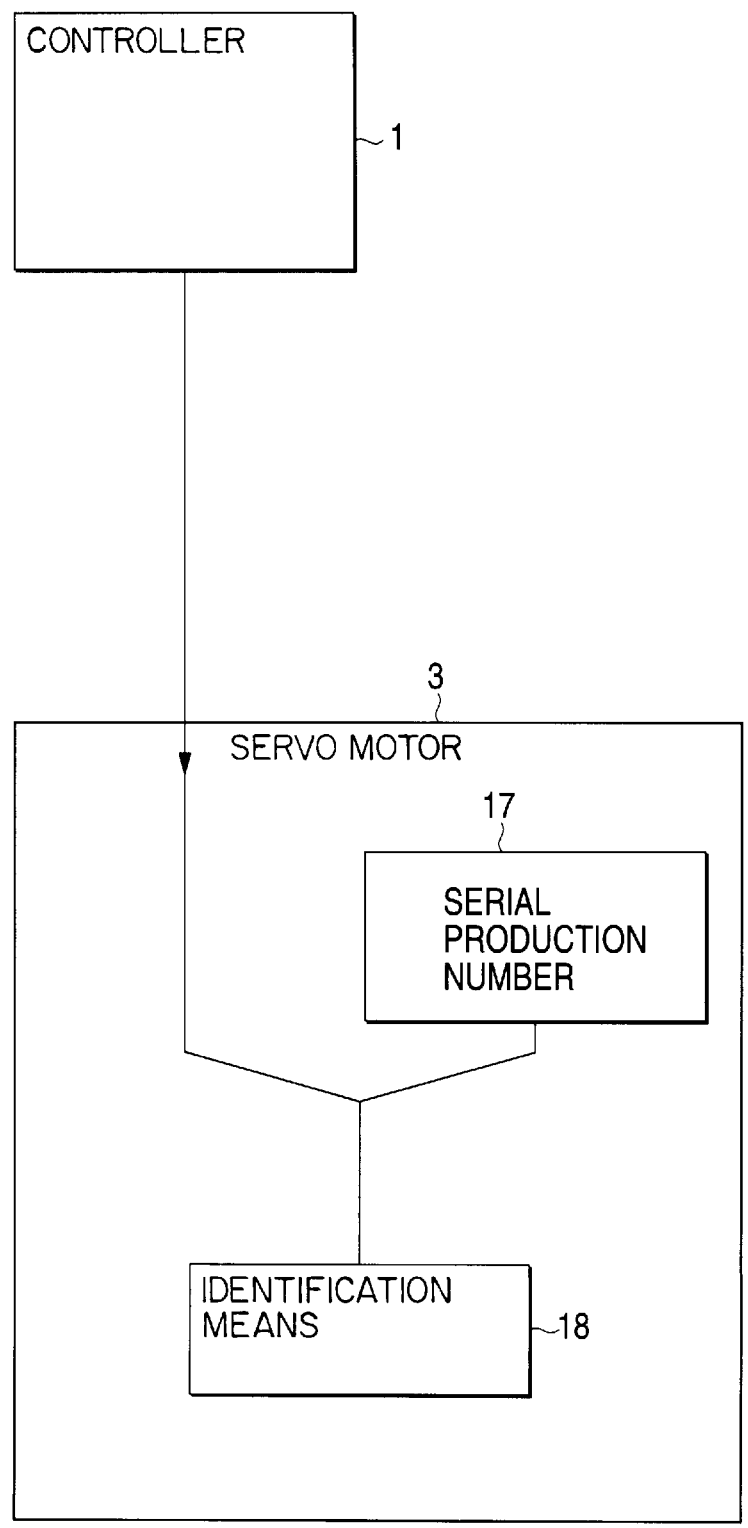
FIG. 4 a block diagram of showing the shaft number identification part in an embodiment of the present invention.
Figure 5:
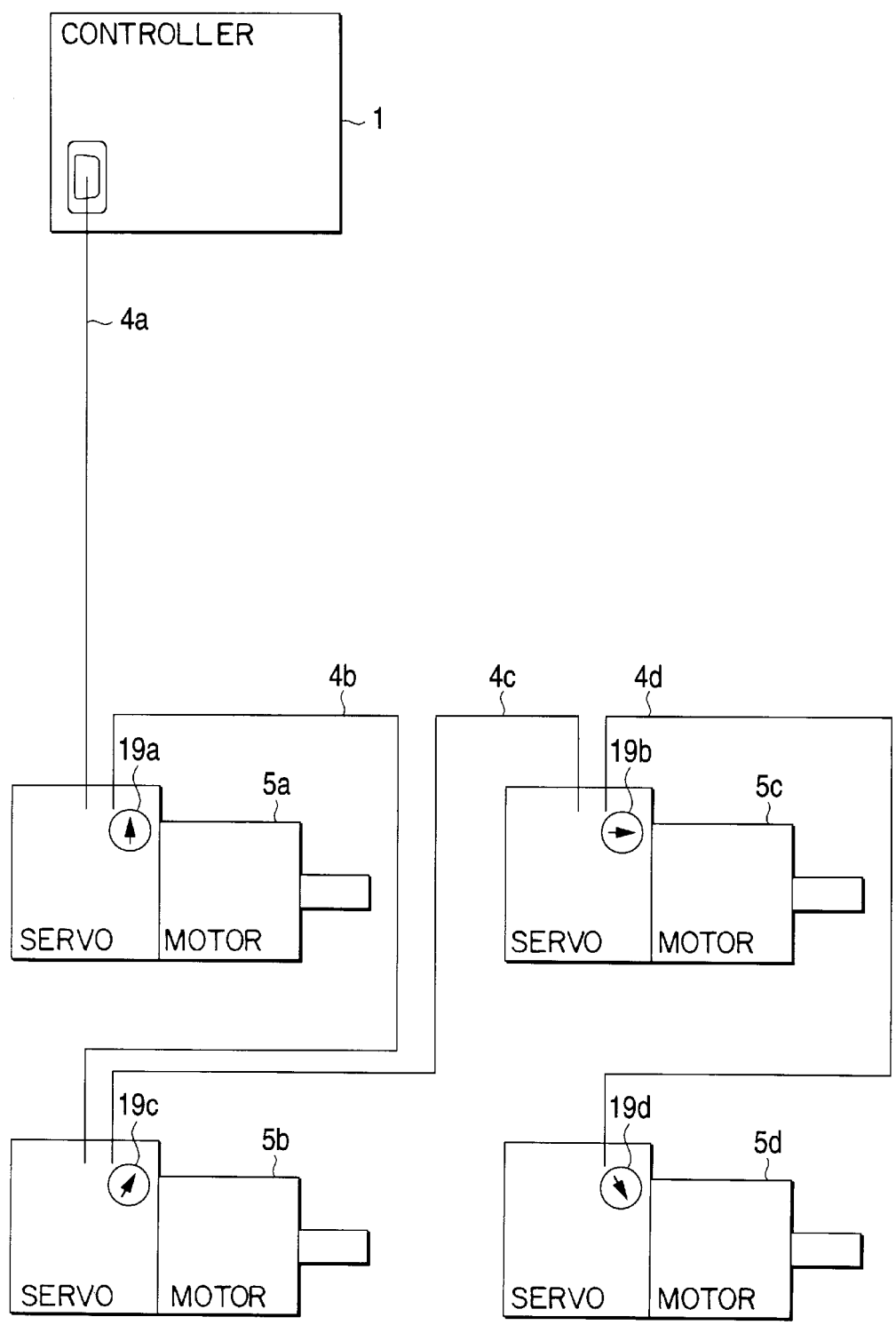
FIG. 5 is a wiring diagram of an exemplified servo system.
Figure 6:
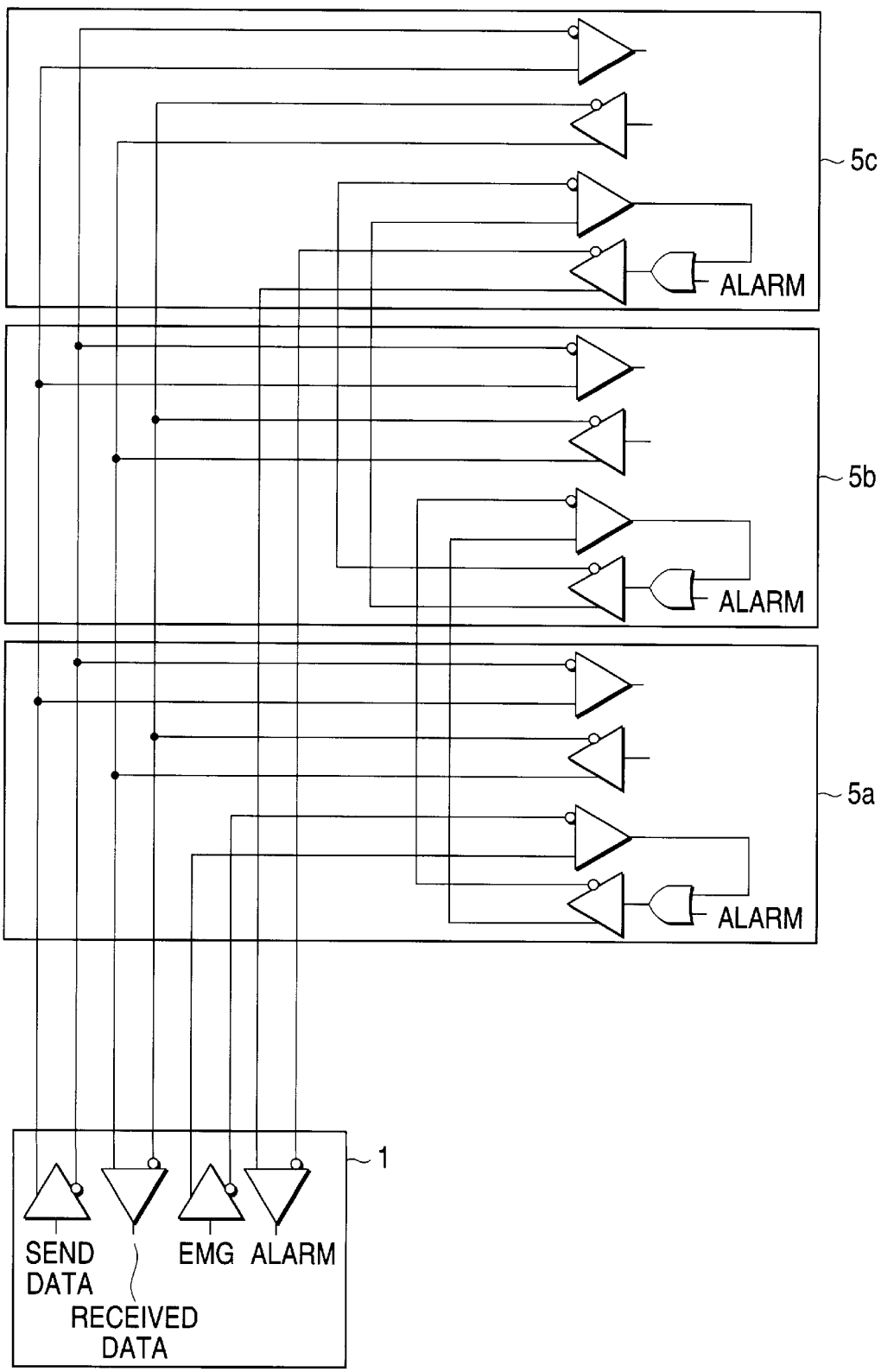
FIG. 6 is a detailed signal diagram of the exemplified servo system.

FIG. 4 illustrates another shaft number identification method besides the method shown in FIG. 3. As in FIG. 4, a non-volatile memory 17 which is provided on the servo drive unit inside the drive-unit-built-in servo motor stores the one and only code, for example a serial number, that is stored at the time of production. In this shaft number identification method, data for a cross-reference table which shows the above-described codes and the shaft numbers are transmitted from the controller 1 to the servo drive units inside the drive-unit-built-in servo motors respectively at the time when a power switch is turned on and stored in a memory (not shown in the figure) in each of the servo drive units. An identification means 18 in the servo drive unit finds a code which is identical to the code stored in the memory 17 from the received cross-reference table and makes the shaft number corresponding to the identical code as the shaft number of its own to perform communication thereafter.

Utilization of this method which realizes the shaft identification that is not based on the mechanical hardware setting inside the servo drive units inside the drive-unit-built-in servo motors allows a structural simplification of the drive-unit-built-in servo motors.

The present invention, as described above, wherein the signals from the controller are transmitted respectively to the drive-unit-built-in servo motors after branching at the branching circuit and wherein the logical sum of the signals from the drive-unit-built-in servo motors is transmitted to the controller, is effective in saving of wiring and in enhancement of reliability in communication between the controller and the drive-unit-built-in servo motors.

The branching circuit wherein as many line drivers as the product of the number of the signal lines for receiving the signals from the controller, multiplied by the number of the drive-unit-built-in servo motors are provided and wherein the line drivers in the branching circuit and line receivers in the drive-unit-built-in servo motors are connected by one to one is effective also in enhancement of reliability in communication between the controller and the drive-unit-built-in servo motors.

The branching circuit wherein as many line receivers as the product of the number of the signal lines for transmitting the signals to the controller, multiplied by the number of the drive-unit-built-in servo motors are provided and wherein the line receivers in the branching circuit and line drivers in the drive-unit-built-in servo motors are connected by one to one is effective also in enhancement of reliability in communication between the controller and the drive-unit-built-in servo motors.

The branching circuit wherein the logical sum of the received data that are transmitted from the plural number of drive-unit-built-in servo motors is transmitted to the controller is effective also in enhancement of reliability in communication between the controller and the drive-unit-built-in servo motors.

The branching circuit wherein the logical sum of the alarm signals that are transmitted from the plural number of drive-unit-built-in servo motors is transmitted to the controller is effective also in enhancement of reliability in communication between the controller and the drive-unit-built-in servo motors.

The branching circuit wherein as many resistors as the number of drive-unit-built-in servo motors with the resistance values different from one another are provide and the drive-unit-built-in servo motors wherein constant voltage circuits and identification means for detecting a current which flows out of the constant voltage circuit and flows into the resistor and for identifying shaft numbers based on this detection result are provided respectively are effective also in production cost reduction through simplification in the structure that eliminates the anti-splash structure at the setting components.

The drive-unit-built-in servo motors wherein memory means and identification means for identifying the shaft number based on the data which are inherent to the motor and stored in the memory means are respectively provided are effective also in production cost reduction through simplification in the structure that eliminates the anti-splash structure at the setting components.

What is claimed is:

1. A servo system comprising:
   a controller;
   a plurality of drive-unit-built-in servo motors that are controlled by said controller; and
   a branching circuit for branching and transmitting signals from said controller respectively to said drive-unit-built-in servo motors and transmitting a logical sum of signals from said drive-unit-built-in servo motors to said controller.

2. A servo system claimed in claim 1, wherein said branching circuit comprises a predetermined number of line drivers, said predetermined number being identical to a product of the number of signal lines for receiving signals from said controller, multiplied by the number of said drive-unit-built-in servo motors, and wherein said line drivers in said branching circuit are respectively connected to a corresponding number of line receivers in said drive-unit-built-in servo motors.

3. A servo system claimed in claim 1, wherein a branching circuit comprises a predetermined number of line receivers, said predetermined number being identical to a product of the number of signal lines for transmitting signals to the controller, multiplied by the number of drive-unit-built-in servo motors, and wherein said line receivers in said branching circuit are respectively connected to a corresponding number of line drivers in said drive-unit-built-in servo motors.

4. A servo system claimed in claim 3, wherein said branching circuit transmits, to said controller, a logical sum of received data transmitted from said plurality of drive-unit-built-in servo motors.

5. A servo system claimed in claim 3, wherein said branching circuit transmits, to said controller, a logical sum of alarm signals transmitted from said plurality of drive-unit-built-in servo motors.

6. A servo system claimed in any one of claims 1 through 5, wherein said branching circuit comprises a predetermined number of resistors having respective different resistance values, said predetermined number being identical to the number of dive-unit-built-in servo motors, and wherein each of said drive-unit-built-in servo motors comprises a constant voltage circuit and an identification circuit for detecting a current that flows out of said resistor and for identifying a shaft number based on a detection result.

7. A servo system claimed in any one of claims 1 through 5, wherein each of said drive-unit-built-in servo motors comprises memory means for storing therein data inherent to said each of said servo motors has memory means for storing therein data inherent to said each of said servo motors, and identification means for identifying a shaft number based on said data stored in said memory means.

8. A servo system claimed in claim 6, wherein each of said drive-unit-built-in servo motors comprises memory means for storing therein data inherent to said each of said servo motors, and identification means for identifying a shaft number based on said data stored in said memory means.

* * * * *